United States Patent
Auno et al.

(10) Patent No.: US 6,554,122 B2
(45) Date of Patent: Apr. 29, 2003

(54) CONVEYOR ASSEMBLY

(75) Inventors: Antti Auno, Jaala (FI); Hannu Paavola, Kouvola (FI)

(73) Assignee: Bevesys Oy, Kouvola (FI)

( * ) Notice: Subject to any disclaimer, the term of this patent is extended or adjusted under 35 U.S.C. 154(b) by 0 days.

(21) Appl. No.: 09/882,287

(22) Filed: Jun. 18, 2001

(65) Prior Publication Data

US 2002/0005338 A1 Jan. 17, 2002

(30) Foreign Application Priority Data

Jun. 16, 2000 (FI) .............................................. 20001435

(51) Int. Cl.⁷ .............................................. B65G 47/10
(52) U.S. Cl. ................. 198/369.3; 198/890.1; 198/370.06
(58) Field of Search ......................... 198/369.3, 370.06, 198/786, 817, 890.1; 193/35 MD

(56) References Cited

U.S. PATENT DOCUMENTS

| 4,019,627 A | * | 4/1977 | Eggert et al. ................ 198/786 |
| 4,151,908 A | * | 5/1979 | Brusa ............................ 198/786 |
| 4,730,718 A | * | 3/1988 | Fazio et al. ............... 198/370.1 |
| 4,795,022 A | * | 1/1989 | Simmons .................... 198/817 |

* cited by examiner

Primary Examiner—Joseph E. Valenza
(74) Attorney, Agent, or Firm—Browdy and Neimark

(57) ABSTRACT

An assembly is disclosed for conveying and rotating/transferring individual containers or beverage bottle cases or the like articles as well as moving or, laterally in a direction orthogonal to the travel direction of the articles, transferring the same, the assembly comprising two or more substantially cylindrical conveyor rolls (15) that are parallel to each other and aligned longitudinally in the travel direction of the articles, the conveyor rolls being adapted rotatable about their axes in order to effect the rotation of the articles or transfer thereof in the lateral direction, plus one or more conveyor belts (12) or the like means for transferring the articles in the longitudinal direction of the conveyor rolls (15), the conveyor belts (12) being adapted to pass over belt support rolls (10). The invention is implemented by way of adapting to each one of the conveyor rolls (15) at least one conveyor belt (12) running in the direction of the longitudinal axis of the roll and having the belt support rolls (10) designed into an integral structure of the conveyor roll (15) so that the support rolls will rotate with the conveyor roll and further having the conveyor belts (12) arranged to run at least substantially in the plane of the cylindrical envelope surface of each conveyor roll (15).

4 Claims, 2 Drawing Sheets

CONVEYOR ASSEMBLY

Figure 1:
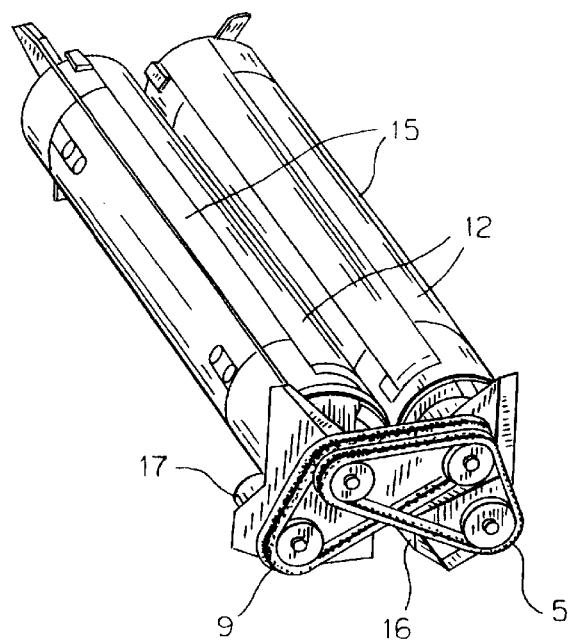

The present invention relates to an assembly for conveying and rotating/transferring articles such as individual containers or beverage bottle cases or the like in a direction lateral to the travel direction thereof, the assembly comprising two or more substantially cylindrical conveyor rolls that are parallel to each other and aligned longitudinally in the travel direction of the articles, the conveyor rolls being adapted rotatable about their axes in order to effect the rotation of said articles or transfer thereof in the lateral direction, plus one or more conveyor belts or the like means for transferring said articles in the longitudinal direction of said conveyor rolls, the conveyor belts being adapted to pass over belt support rolls.

Conveyor assemblies are used as the horizontal infeed equipment of individual container-like articles such as beverage bottles and cans in a redemption machine. Conventional infeed equipment are generally implemented using two horizontal, in parallel running belts that are driven by means of belt support rolls or the like elements. The belts are naturally aligned to run in the travel direction of the articles and may form a small angle with each other so that the article can rest on both sides thereof on both belts. This type of infeed assembly must be complemented with a separate device serving to rotate the container item about its longitudinal axis so that a barcode reader can identify the bar code printed on the item. As such devices are equipped with solid and continuous belts, a rotating means cannot be made to operate through the belts, but instead, the rotating means is implemented using a separate element adapted to rotate transverse to the travel direction of the conveyor, generally in the interbelt gap.

Another solution is described in Fl Pat. Appl. No. 19,991,724, wherein is disclosed an infeed conveyor in which the forward-feeding conveyor means are formed by orthogonally to the travel direction placed infeed elements and the rotating means are disk-like rotary elements rising up in the gaps between the infeed elements.

These and other known conveyors that also are required to provide the rotation of the article being transferred in a direction orthogonal to the travel direction, means operating independently from each other must be used to implement two movements in orthogonal directions. Hence, these conveyor constructions typically occupy a large space and a plurality of separate units that must be adapted to cooperate.

It is an object of the present invention to provide a conveyor assembly free from the above-described disadvantages. The assembly according to the invention is characterized in that each one of the conveyor rolls has adapted thereon at least one conveyor belt running in the direction of the longitudinal axis of the conveyor roll and that the belt support rolls are designed into an integral structure of the roll so that the support rolls will rotate with the conveyor roll and that the conveyor belts are arranged to run at least substantially in the plane of the cylindrical envelope surface of each conveyor roll. This kind of conveyor roll construction with an integral conveyor belt is extremely compact thus saving space in the machine. Moreover, the construction is rather simple to fabricate.

A preferred embodiment of the invention is characterized in that each one of the conveyor rolls has one endless conveyor belt and that the belt support rolls are mounted on bearings running at the ends of the conveyor roll.

Another preferred embodiment of the invention is characterized in that said conveyor rolls operate pairwise in parallel and that, in the rest position of the conveyor rolls, the surfaces of the conveyor belts are arranged to form an essentially V-shaped angle with each other, whereby an articles such as a bottle, can or the like to be transferred sinks at least partially into the recess formed by the conveyor rolls and the conveyor belts come into contact with the article.

A still another preferred embodiment of the invention is characterized in that a plurality of the conveyor rolls operate in a parallel disposition and that, in the rest position of the conveyor rolls, the conveyor belts are arranged to run along the conveyor roll areas substantially forming the top surface of the conveyor rolls, whereby the article being transferred such as a beverage bottle case moves forward on the conveyor belts when they are running, while the rotation of the conveyor rolls makes the article to move sideways on the conveyor rolls.

Figure 2:
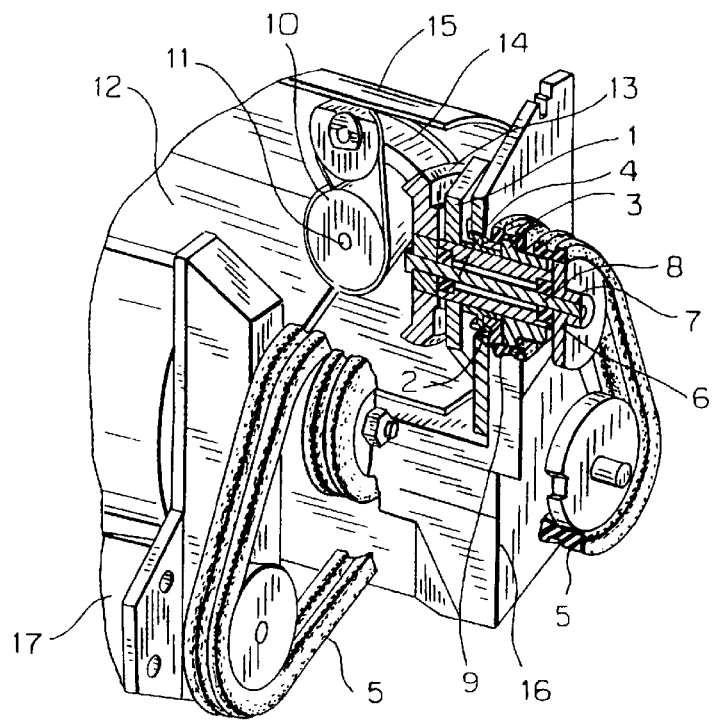
Figure 3:
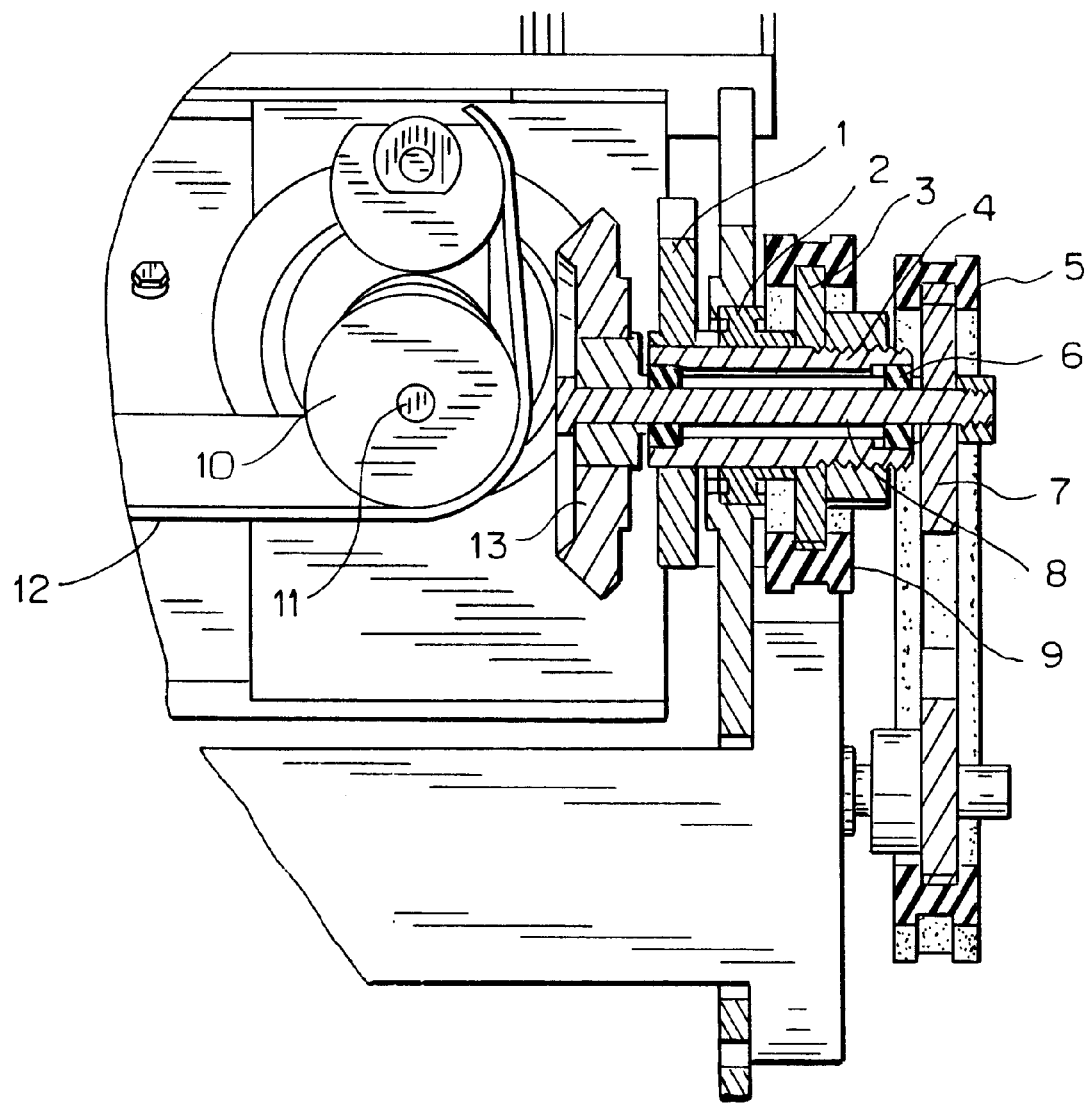

In the following, the invention will be described in greater detail with the help of a preferred embodiment by making reference to the appended drawings in which FIG. 1 is obliquely from above taken view of a preferred embodiment of a conveyor construction of according to the invention;

FIG. 2 is an axonometric sectional view of the power transmission of the conveyor; and FIG. 3 is sectional side view of the same power transmission.

A conveyor according to the invention comprises two or more hollow conveyor rolls 15 operating in parallel. In FIG. 1 is shown an exemplifying embodiment having two conveyor rolls arranged in parallel. The surfaces of the conveyor rolls 15 have adapted running thereon endless conveyor belts 12, whose load-carrying surfaces are dimensioned to run essentially in the same plane with the cylindrical outer surfaces of the conveyor rolls. The conveyor belts 12 are arranged to form in the rest positions of the conveyor rolls 15 an essentially V-shaped angle with each other, whereby an articles such as a bottle, can or the like sinks at least partially into the recess formed by the conveyor rolls and the conveyor belts 12 come into contact with the article on both sides thereof.

The conveyor belts are passed over belt support rolls 10 (see FIGS. 2 and 3) that are mounted at the ends of the conveyor rolls 15, possibly entirely or at least partially to the interior of the conveyor roll 15. The conveyor rolls 15 in turn are mounted on bearings 2 on the framework of the conveyor so that they can be rotated about the conveyor roll shafts 4. Each one of the shafts 4 of the conveyor rolls 15 is rotatably mounted on the conveyor roll body 1. For the rotation of the conveyor rolls, toothed gearwheels 3 are mounted on the conveyor roll shafts 4. Into the inner bore of the conveyor roll shafts 4 is mounted on bearings a second shaft 8 having a straight-toothed gearwheel 7 mounted on its one end, while the other end of the roll 15 is provided with a bevel gear 13. The cooperating bevel gear 14 is mounted on the shaft 11 of the belt support roll 10. Onto the framework of the conveyor are mounted two drive motors 16 and 17. One of the motors serves to drive the conveyor roll shafts 4 and the other is connected to drive the inner shafts 8.

The function of the conveyor according to the invention is as follows: drive power from the first motor 17 is transmitted to the gearwheels 3 mounted on the shafts 4 of the conveyor rolls 15. This motor is capable of rotating both rolls 15 and, hence, any articles such as bottles or cans (not shown) resting thereon. Drive power from the second motor 16 is transmitted to the inner shafts 8. The bevel gears 13, 14 mounted to the other ends of these shafts 8 transmit the drive power to the belt support rolls 10 that in turn move the belts 12. In this fashion, controlling the second motor 16 allows articles to be moved in the travel direction of the belts 12, while the other motor 17 can be used to rotate the articles about their longitudinal axis. Both motors are provided with a bidirectional control. Accordingly, the conveyor construction according to the invention is characterized by having the belts 12 designed integral with the conveyor roll structure. In summary, when conveyor rolls are rotating, the belts do rotate with the conveyor rolls but are not actuated in their longitudinal travel direction. Respectively, when the belts are moving in their travel direction, the conveyor rolls are kept stationary.

The same principle may be utilized, e.g., in the transfer of box-shaped articles such as beverage bottle cases. By way of placing a plurality of conveyor rolls 15 in parallel, it is possible to obtain a conveyor, wherein cases can be moved in the longitudinal direction by running the belts 12 and in the lateral direction by rotating the conveyor rolls 15. Advantageously, the conveyor belts 12 are herein adapted to run along the conveyor roll areas that in the stopped position of the rolls substantially form the top surface of the rolls, whereby the article such as a beverage bottle case moves forward on the conveyor belts 12 when they are running, while the rotation of the conveyor rolls 15 makes the article to move sideways on the conveyor rolls. This kind of arrangement is useful, among other applications, at conveyor junctions where different cases must be sorted to travel toward different target positions.

To those skilled in the art, it is obvious that the invention is not limited to the above-described exemplifying embodiments, but rather, may be modified within the scope of the appended claims.

What is claimed is:

1. Assembly for conveying and rotating/transferring individual containers or beverage bottle cases or the like articles as well as moving or, laterally in a direction orthogonal to the travel direction of the articles, transferring the same, the assembly comprising two or more substantially cylindrical conveyor rolls (15) that are parallel to each other and aligned longitudinally in the travel direction of the articles, the conveyor rolls being adapted rotatable about their axes in order to effect the rotation of said articles or transfer thereof in the lateral direction, plus one or more conveyor belts (12) or the like means for transferring said articles in the longitudinal direction of said conveyor rolls (15), the conveyor belts (12) being adapted to pass over belt support rolls (10), characterized in that each one of the conveyor rolls (15) has adapted thereon at least one conveyor belt (12) running in the direction of the longitudinal axis of the conveyor roll and that the belt support rolls (10) are designed into an integral structure of the conveyor roll (15) so that the support rolls will rotate with the conveyor roll and that the conveyor belts (12) are arranged to run at least substantially in the plane of the cylindrical envelope surface of each conveyor roll (15).

2. Assembly according to claim 1, characterized in that each one of said conveyor rolls (15) has one endless conveyor belt (12) and that the belt support rolls (10) are mounted on bearings running at the ends of the conveyor roll (15).

3. Assembly according to claim 1 or 2, characterized in that said conveyor rolls (15) operate pairwise in parallel and that, in the rest position of the conveyor rolls, the surfaces of the conveyor belts (12) are arranged to form an essentially V-shaped angle with each other, whereby an article such as a bottle, can or the like to be transferred sinks at least partially into the recess formed by the conveyor rolls and the conveyor belts (12) come into contact with the article on both sides thereof.

4. Assembly according to claim 1 or 2, characterized in that a plurality of the conveyor rolls (15) operate in a parallel disposition and that, in the rest position of the conveyor rolls, the conveyor belts (12) are arranged to run along those conveyor roll areas that in the rest position of the rolls substantially form the top surface of the conveyor rolls, whereby the article such as a beverage bottle case moves forward on the conveyor belts (12) when they are running, while the rotation of the conveyor rolls makes the article to move sideways on the rolls.

* * * * *